(12) United States Patent
Tonkin et al.

(10) Patent No.: US 11,543,932 B1
(45) Date of Patent: Jan. 3, 2023

(54) RULE-BASED PRIORITIZATION AND ACTIVATION OF OVERLAPPING SCREEN AREAS USING POINTING DEVICE

(71) Applicant: mmhmm inc., Little Rock, AR (US)

(72) Inventors: Matthew Tonkin, Unley (AU); Phil Libin, San Francisco, CA (US); Gabe Campodonico, Oakland, CA (US); Stephen James White, San Francisco, CA (US); Seth Hitchings, Needham, MA (US); Dairien Marcus Boyd, San Francisco, CA (US)

(73) Assignee: mmhmm inc., Little Rock, AR (US)

( * ) Notice: Subject to any disclaimer, the term of this patent is extended or adjusted under 35 U.S.C. 154(b) by 0 days.

(21) Appl. No.: 17/510,618

(22) Filed: Oct. 26, 2021

Related U.S. Application Data

(60) Provisional application No. 63/107,107, filed on Oct. 29, 2020.

(51) Int. Cl.
| | |
|---|---|
| *G06F 3/04812* | (2022.01) |
| *G06F 3/04842* | (2022.01) |
| *G06F 3/04886* | (2022.01) |

(52) U.S. Cl.
CPC ...... *G06F 3/04812* (2013.01); *G06F 3/04842* (2013.01); *G06F 3/04886* (2013.01); *G06F 2203/04804* (2013.01); *G09G 2320/06* (2013.01)

(58) Field of Classification Search
None
See application file for complete search history.

(56) References Cited

U.S. PATENT DOCUMENTS

| | | | |
|---|---|---|---|
| 2003/0018664 A1* | 1/2003 | Wee ................. | H04N 21/23895 348/E7.071 |
| 2015/0012881 A1* | 1/2015 | Song ................... | G06F 3/04842 715/803 |
| 2016/0085221 A1* | 3/2016 | Terada ............... | G06F 3/04847 700/17 |
| 2016/0343351 A1* | 11/2016 | Chen ..................... | G09G 5/005 |
| 2018/0307754 A1* | 10/2018 | Somlai-Fischer ..... | G06F 3/0485 |
| 2019/0243882 A1* | 8/2019 | Fialkow ................. | G06F 40/14 |
| 2020/0128882 A1* | 4/2020 | Davis .................. | A61M 11/042 |
| 2020/0396325 A1* | 12/2020 | Zhong .................. | G06F 9/4881 |

* cited by examiner

*Primary Examiner* — Daniel Rodriguez
*Assistant Examiner* — Gabriel Mercado
(74) *Attorney, Agent, or Firm* — Muirhead and Saturnelli, LLC

(57) ABSTRACT

Selecting an active one of a plurality of screen areas of one or more applications presented to a user on a screen includes determining properties of the screen areas corresponding to brightness, playing audio, displaying an avatar, transparency of an avatar, timing of new content, intensity of content change, number of objects, number of objects in an intersection of multiple areas, and/or speed of objects in a particular area, setting one or more rules for choosing one of a plurality of the screen areas for a plurality of applications based on at least one of the properties, and selecting a particular one of the screen areas to be the active one of the plurality of screen areas based on the rules, the properties, and location of a pointer or touch area. The avatar may be located, at least partially, within an intersection of different ones of the screen areas.

20 Claims, 7 Drawing Sheets

RULE-BASED PRIORITIZATION AND ACTIVATION OF OVERLAPPING SCREEN AREAS USING POINTING DEVICE

CROSS-REFERENCE TO RELATED APPLICATIONS

This application claims priority to U.S. Prov. App. No. 63/107,107, filed on Oct. 29, 2020, and entitled "RULE-BASED PRIORITIZATION AND ACTIVATION OF OVERLAPPING SCREEN AREAS USING POINTING DEVICE", which is incorporated herein by reference.

TECHNICAL FIELD

This application is directed to the field of information processing and user interface in screen-based computer systems, and more specifically to rule-based prioritization and activation of multiple overlapping screen areas under the control of multiple user-operated pointing devices, including touch-based devices and instruments.

BACKGROUND OF THE INVENTION

Important trends in business and consumer computing are causing an upsurge in downloads and in the simultaneous use of multiple applications by an average mobile and desktop user. These trends include increasing size and enhanced resolution of computer screens, the arrival of retina and 4K/5K displays, a constantly growing raw computing power and multi-tasking capabilities of mobile devices, notebooks, and desktops, combined with the expansion of application stores for significant computing platforms.

According to industry statistics, the largest application store is Google Play with over 2.7 million Android applications. The second-largest is the Apple App Store, which carries 1.82 million iOS applications. In 2019, global downloads of mobile applications to connected user devices reached 204 billion copies. An average mobile user has 20 downloaded applications installed and 25% of users have over 30 installed applications, with an average of 25 downloaded and pre-installed applications per month. For the most part, an average user works with 10 applications simultaneously running at any given time. Notebooks and desktops on major platforms, such as MacOS, Windows, Linux, Chrome, and combined multi-platform installations may run simultaneously dozens of applications, some of which may be in multi-instance modes; the latter is illustrated by office and communication applications with multiple documents and messages open at the same time.

From a geometrical standpoint, a computer screen during an intense user working session represents a densely covered space with multiple overlapping screen areas (windows), controlled by different applications. For the most part, the screen areas have rectangular shapes, but some of the areas, such as user masks in video capturing applications and other accessibility contours, whether predefined by an application or customized by a user, may be non-rectangular; for example, the mmhmm video communication and recording application allows circular user masks. Obtaining access to frequently changing screen areas, controlled by various simultaneously running applications, is done predominantly by a pointing device, such as computer mouse, touchpad, trackpad, digital pen, game console, user fingers performing multi-touch gestures on a touch screen, etc.

SUMMARY OF THE INVENTION

According to the system described herein, selecting an active one of a plurality of screen areas of one or more applications presented to a user on a screen includes determining properties of the screen areas corresponding to brightness, playing audio, displaying an avatar, transparency of an avatar, timing of new content, intensity of content change, number of objects, number of objects in an intersection of multiple areas, and/or speed of objects in a particular area, setting one or more rules for choosing one of a plurality of the screen areas for a plurality of applications based on at least one of the properties, and selecting a particular one of the screen areas to be the active one of the plurality of screen areas based on the rules, the properties, and location of a pointer or touch area. The avatar may be located, at least partially, within an intersection of different ones of the screen areas. The avatar may be of a person making a presentation and the intersection of different ones of the screen areas may include at least a portion of a presentation slide being used by the person. The screen area that includes the avatar may be selected in response to a current hovering pointer being over the contour of the avatar. The screen area that includes the avatar may be selected in response to either touching or clicking into an area within the contour of the avatar. The screen area that includes the presentation slide may be selected in response to a current hovering pointer being over the contour of the avatar and the avatar having a transparency less than a predetermined threshold, which may be 50%. The screen area that includes the presentation slide may be selected in response to either touching or clicking into an area within the contour of the avatar and the avatar having a transparency less than a predetermined threshold, which may be 50%. A particular one of the screen areas that intersects with an other one of the screen areas may be selected based on where a text object has most recently appeared. The text object may be received a chat area or an email pane. A particular one of the screen areas that intersects with an other one of the screen areas may be selected based on the particular one of the screen areas being a gaming area or an area containing an image that is being edited. At least some of the rules may be composite rules that combine other rules and additional constraints. An arbiter component may aggregate rule outcomes into a choice of a particular one of the screen areas.

According further to the system described herein, a non-transitory computer readable medium contains software that selects an active one of a plurality of screen areas of one or more applications presented to a user on a screen. The software includes executable code that determines properties of the screen areas corresponding to at least one of: brightness, playing audio, displaying an avatar, transparency of an avatar, timing of new content, intensity of content change, number of objects, number of objects in an intersection of multiple areas, and speed of objects in a particular area and executable code that selects a particular one of the screen areas to be the active one of the plurality of screen areas based on the properties, location of a pointer or touch area, and on one or more rules that are set for choosing one of the plurality of the screen areas for the plurality of applications based on at least one of the properties.

With the current generation of user interfaces and the predominant screen control metaphor, prioritization and activation of the overlapping and partially visible (or hidden from view) screen areas is completely left to a user, who faces complex multi-layer on-screen configurations and has to choose between minimizing or otherwise temporarily erasing from the screen some of the overlapping screen areas, putting select areas in focus for data entry, choosing other areas for the viewing and presentation purpose, etc. The user may be continuously interacting with the screen areas for different applications and multiple instances of the same multi-instance applications. Such prioritization and activation processes are normally described to users and developers through the notions of active, foreground, focus, top-level and other types of windows and often causes user confusion and well documented issues with controlling the computer screen where multiple screen areas are simultaneously present.

Part of the problem is an increasingly dynamic nature of content supported by connected, intelligent and live applications; many of the applications may possess complex behaviors only partially controlled by the user (for example, games) or may be completely out of user control (various connected messaging, informational and other applications, countless types of notifications and alerts, etc.). The prevalence of dynamic content calls for system assistance through the process of an intelligent, constantly updated, and content-centric prioritization and activation of screen areas.

Accordingly, it is important to develop techniques and systems for assisted prioritization and activation of overlapping screen areas by a user operating a pointing device.

The proposed system continuously monitors screen areas supported by one or multiple running applications and by the application content associated with these areas, detects intersections of the screen areas, and assesses dynamic priorities of the intersecting areas or activates one of the intersecting areas when the coordinates of a hovering pointer, a pointing or a multi-touch gesture appear within such intersections. Prioritization and activation are based on the properties of the overlapping screen areas reflecting the content and other attributes of the screen areas and on a set of prioritization and activation rules that depend on such properties as the parameters of the rules.

System functioning may be explained as follows.
1. Screen areas or windows, supported by one or multiple applications on a desktop, notebook, tablet, smartphone, or other device are displaying content, generated by applications and application data; two or more visible (at least partially) screen areas of currently running applications may intersect on the screen.
2. A screen coordinate or a coordinate zone of a pointer, a click, a multi-touch or other gesture produced by a pointing device, such as a mouse, trackpad, electronic or light pen, game console, user finger(s), etc., may fall within an intersection of two or more screen areas or contain a portion of such intersection (for example, in case of a resizing two-finger gesture on a touch screen), which results in an uncertainty as to which of the screen areas under the pointer should be prioritized (in case of a hovering pointer), activated or operated.
3. The uncertainty in prioritization and activation between the intersecting screen areas may be resolved by a continuous assessment of dynamic priorities associated (i) with the properties of the overlapping screen areas and content; and (ii) with the set of prioritization and activation rules that depend on such properties.
4. Examples of prioritization and activation rules may include:
    a. Prioritizing/activating a brightest or the darkest of the overlapping screen areas (which may be assessed using various brightness metrics).
    b. Prioritizing/activating a screen area, among multiple overlapping areas, that currently plays audio/music (the rule may be moot if none or more than one screen area does that).
    c. Prioritizing/activating a screen area which displays an avatar of a person (or another object, such as a car, a building, or a tree) that is located, at least partially, within the intersection of several screen areas and under the current hovering pointer or in the touch area of an activation gesture.
    d. Same as previous, except corrected for the transparency of the image of the avatar; the previous rule 4c applies to this case only if the current transparency of the avatar is below a predefined threshold (for example, 50%); if an avatar/object is quite transparent, the area of the avatar is not selected. As an example, rules 4c and 4d have been implemented in the mmhmm software to dynamically prioritize and activate the screen area associated with a mask of a presenter if the mask overlaps with the screen area of presentation slides based on a position of the avatar of a presenter relative to a current pointer position.
    e. Select an area where a new text object (document, message, etc.) has appeared most recently. For instance, if
        i. A chat area and an email pane are intersecting.
        ii. The pointer hovers above the intersection.
        iii. The most recent chat entry has been entered at 10:22 am and the most recent email has arrived at 10:25 am.
        iv. Then the system will prioritize (choose in case of a click or a [multi-]touch gesture) the email pane, because the latest text object that arrived at the email pane has been more recent than the arrival at the chat pane (10:25 am vs. 10:22 am).
    f. Select the area where the content has been changing most intensively for some period before the prioritization or activation decision. According to this rule, a document area may lose activation priority to a gaming or an image editing area.
5. Composite rules and arbiter. The system is continuously assessing the relevant properties of screen areas and the content associated with different active applications, along with the overlap of the screen areas and the pointer position with respect to the intersection of the areas. When a decision on prioritizing or activating an area overlapping with other area(s) is made, two system actions are invoked:
    a. The applicable rules are actuated.
    b. The arbiter component aggregates rule outcomes into a choice of the prioritized/activated area.
    There may be different types of rule hierarchies, ranking, composite rules and weighted scoring of rule sets. Rules may be combined by Boolean expressions, ordered, scored, etc.
6. Examples of composite rules and rule arbiters may include:
    a. A hierarchy of three rules:
        (1) Select an area where the content includes maximum number of objects—cars, people, trees.
        (2) Rule (1) & maximum number of same objects in the intersection of areas.
        (3) Rule (2) & maximum number of same objects under the pointer.
        In this example, each subsequent rule may serve as a tiebreak for the preceding rules.

b. Select the area among a set of intersecting areas where the average speed of dynamic objects is the highest|the area that has the center closest to the previously selected area.

The second part of the rule (6b) may serve as a fall back in case when, for instance, all content in the intersecting screen areas is static.

Rules and aggregation conduits may be assigned to screen areas supported by each application at the design phase and may be potentially updated or set up by users.

A formula for dynamic prioritization and choice results among multiple screen areas with dynamic content controlled by a pointing device or instrument can be expressed as follows:

$$A^*(t,D) = \mathbb{R}\left(\{P_i(A_i(t), C_i(t))\}, t, \vec{x}^D(t), \cap A_i(t)\right),$$

where A* is the chosen or prioritized screen area;
t is the calendar time or the internal computer time;
D is the pointing device;
$\mathbb{R}$ is the set of prioritization and choice rules described above;
$A_i(t)$ are the dynamic intersecting screen areas of different applications or of instances of the same application;
$\cap A_i(t)$ is the intersection of the dynamic screen areas at the time t;
$C_i(t)$ is the dynamic application content identified by the system in each screen area and relevant to prioritization and choice of the optimal area A*;
$P_i$ is a set of parameters for a particular dynamic application area used by the prioritization and choice rules, as explained elsewhere herein; the parameters may combine and aggregate the properties of the content and the area (for example, density, types, color, size and speed of content objects, geometry, and shape of the area, etc.)
$\vec{x}^D$ are dynamic (x, y) or, in some cases, (x, y, z) coordinates of the pointing device hovering over the screen or touching the screen; the most intense processing of the prioritization and choice rules normally occurs when the dynamic coordinates of the pointing device enter the intersection of the screen areas, $\vec{x}^D(t) \in \cap A_i(t)$.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism for dynamic prioritization and activation of running applications by a pointing device located in the intersection of the screen areas occupied by the application content based on a hierarchic system of prioritization rules.

Figure 1:
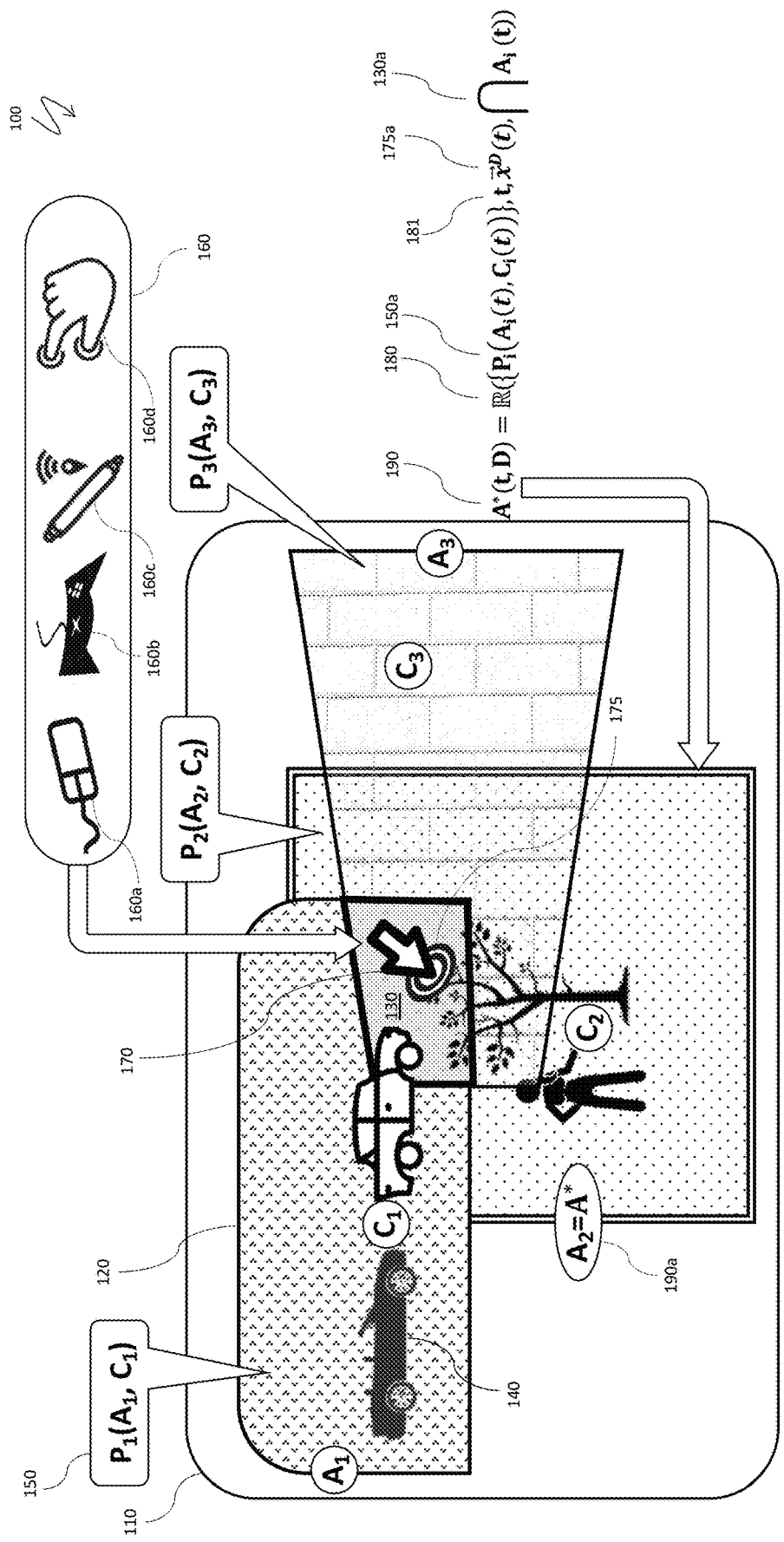
FIG. 1 is a schematic illustration of system components and functioning, according to an embodiment of the system described herein.

FIG. 1 is a schematic illustration 100 of system components and functioning. A computers screen 110 of a desktop or mobile computer, a smartphone or other device is partially or fully occupied by dynamically allocated screen areas 120 of running applications that may form an intersection 130. Each screen area may have content 140 produced by a corresponding application. The combination of an application screen area and content is characterized by a dynamically changing set of parameters 150 ($P_i(A_i(t), C_i(t))$ in the notations of the Summary section). Screen control is performed by a pointing device 160, which may be a mouse, a trackpad, a digital pen, or a game console. A user may control the screen 110 using multi-touch gestures. Different devices may generate a click 170 at an (x, y) coordinate 175 or a hovering cursor (not shown in FIG. 1) that may be characterized by a two- or three-dimensional coordinate and may have other parameters depending on the type of the device and the screen technology.

Subsequently, a set of rules 180 ($\mathbb{R}$) depending on parameters 150a of the applications screen areas and the properties of the content within the areas generated by the applications, at a time 181, on a vector 175a of the pointing device coordinates $\vec{x}^D$(t) and on the characteristics of an intersection 130a of the screen areas $\cap A_i(t)$ determines a priority or activation area 190 (A*), which is also marked on the screen as a screen area 190a.

Figure 2:
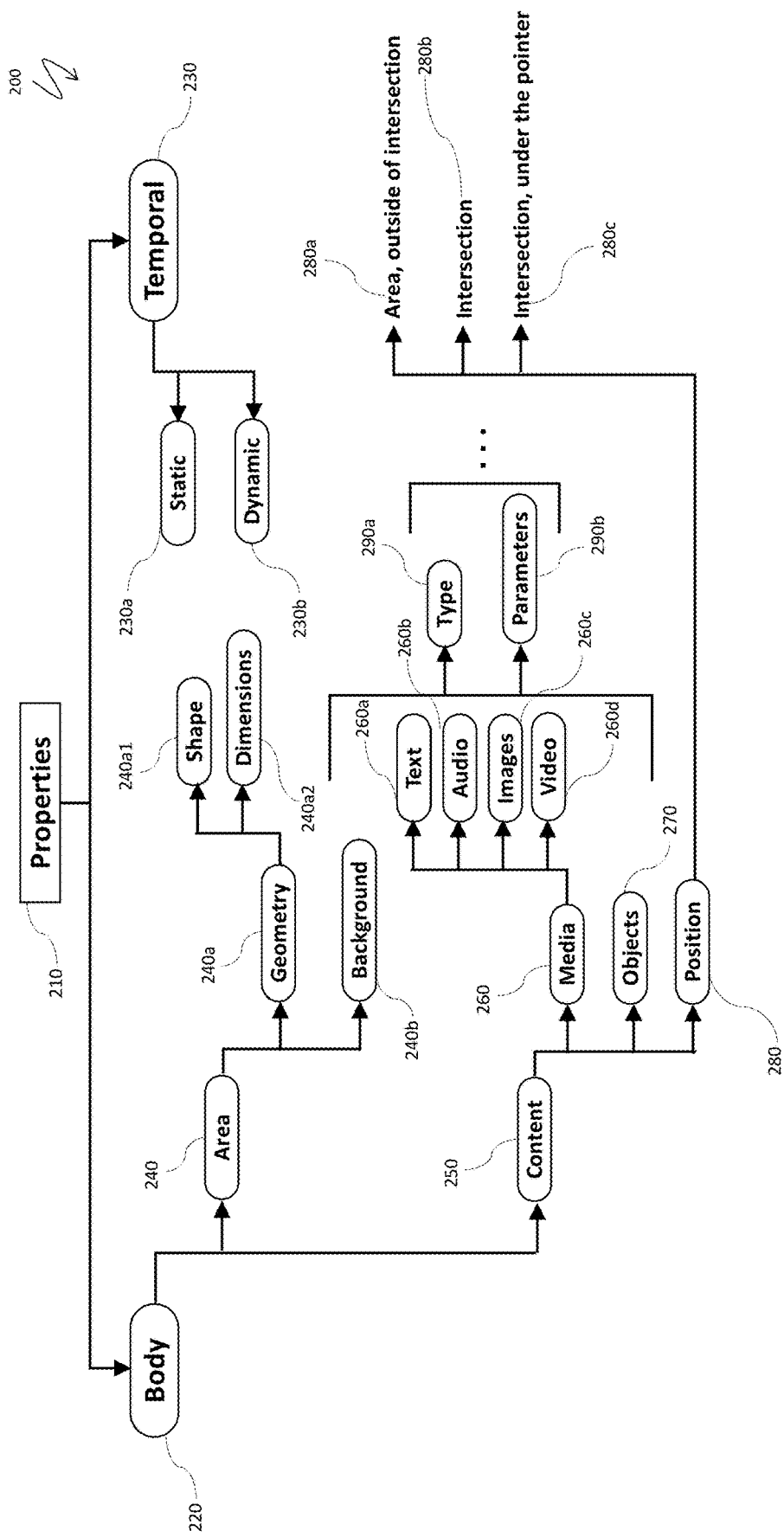
FIG. 2 is a schematic illustration of categorization of area and content properties, according to an embodiment of the system described herein.

FIG. 2 is a schematic illustration 200 of categorization of area and content properties. A categorization chart 210 includes two high-level categories of a property body 220 and of temporal characteristics 230 of properties, which has only two subcategories of static properties 230a and of dynamic properties 230b. The body category 220 has two immediate subcategories, corresponding to the descriptions of FIG. 1 and representing a screen area subcategory 240 and a content subcategory 250. The screen area subcategory 240 has two subcategories: a geometry subcategory 240a and a background subcategory 240b, of which the geometry subcategory 240a has two subordinate subcategories—a shape subcategory 240a1 and a dimensions subcategory 240a2. A background subcategory 240b is terminal.

A content subcategory 250 has three immediate subcategories—media 260, objects 270, and position 280, characterizing content properties. An objects subcategory 270 is not detailed in FIG. 2 (which may require a separate categorization chart), whereas a media subcategory 260 is further categorized by media types—text 260a, audio 260b, images 260c, and video 260d, each of the media types 260a-d having subtypes—subcategory 290a and parameters 290b. Examples of subtypes may include speech and music for audio and plain and formatted text for text, while examples of parameters may include audio volume and timbre, text size and style, image dimensions and resolution, etc. A position subcategory 280 defines content location characteristics relevant to prioritization and activation tasks and includes a position 280a in the area, outside of the intersection with other screen areas, a position 280b within the intersection of multiple screen areas, and a position 280c within the intersection and under the pointer.

Figure 3:
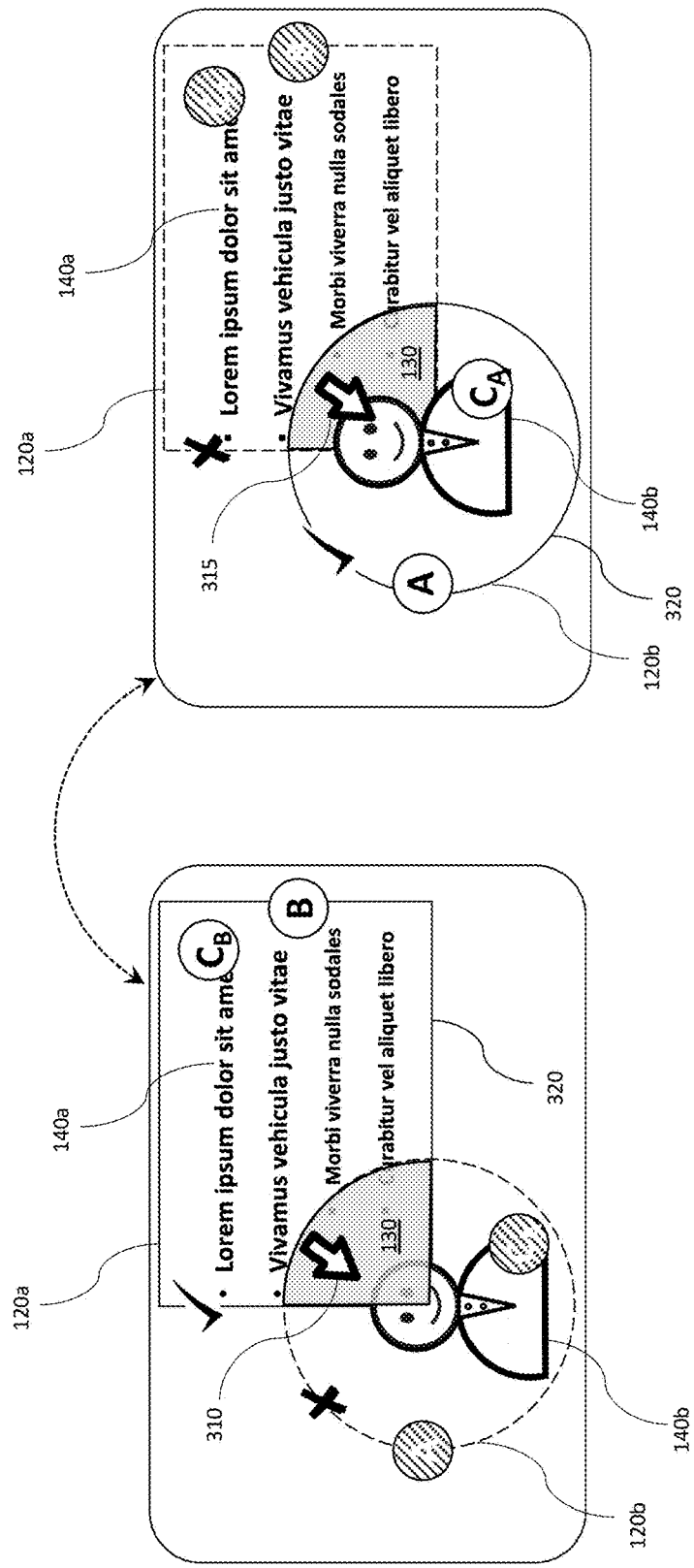
FIG. 3 is a schematic illustration of dynamic prioritization of avatar and presentation screen areas for a hovering pointer, according to an embodiment of the system described herein.

FIG. 3 is a schematic illustration 300 of dynamic prioritization of avatar and presentation screen areas for the hovering pointer. Two intersecting screen areas 120a, 120b are representing two associated types of content: a presentation slide 140a and an avatar 140b of the presenter, captured with circular mask and immersed into the presentation view. A cursor 310, 315 is hovering over the intersection 130 of the two screen areas (hinting at an electromagnetic technology used for the screen and an inductive pointing device, such as a mouse or a tethered/wireless pen).

Initially, at the left portion of FIG. 3, the cursor 310 is hovering outside a contour of the avatar 140b of a presenter over the slide content 140a; accordingly, a priority 320 is given to the slide area 120a, which is located on top of the area 130b within the intersection 130. Subsequently, the cursor 315 crosses the contour of the avatar 140b (the right portion of FIG. 3) and the situation changes: prioritization rules instruct the system to choose the avatar 140b over the presentation slide 140a; accordingly, the priority 320 is given to the screen area 120b, which puts the screen area 120b on top of the screen area 120a, bringing the avatar 140b to the foreground. (Note that the Latin letters A, B and the notations $C_A$, $C_B$ also indicate screen areas and content, while the checkmark and the delete sign show prioritized and deprioritized, foreground and background screen areas.)

Figure 4:
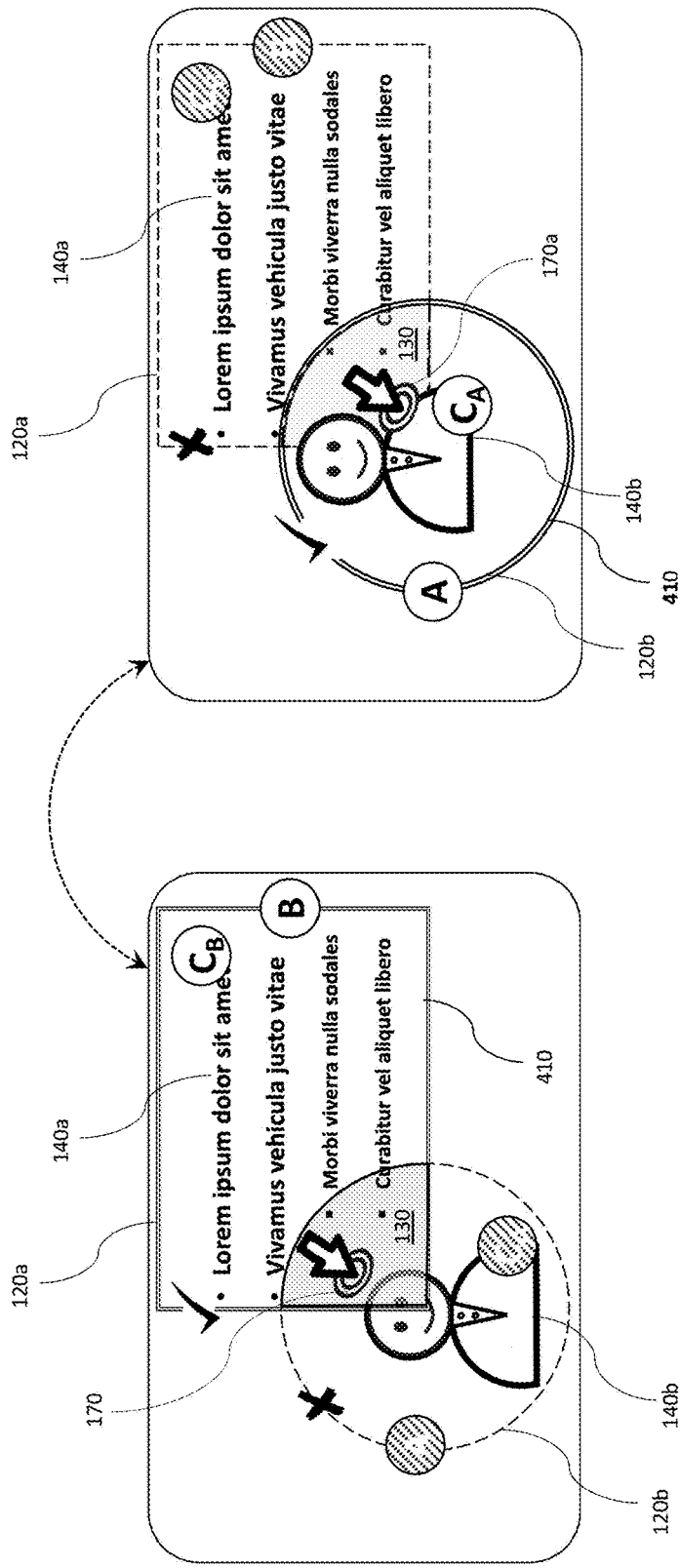
FIG. 4 is a schematic illustration of activation options for overlapping screen areas of a presenter and a presentation, according to an embodiment of the system described herein.

FIG. 4 is a schematic illustration 400 of the activation options for overlapping screen areas of a presenter and a presentation. Under the same notations as in FIG. 3 (the screen areas 120a, 120b and the intersection 130, and the associated presentation slide 140a and the avatar 140b captured with a circular mask), the pointing method is a click 170, 170a. Analogously to the situation in FIG. 3, the initial click 170 in the intersection 130 of the screen areas in the left side of FIG. 4 is made outside the contour of the avatar 140b and the activation 410 under the prioritization and activation rules belongs to the slide area 120a. In contrast, in the right side of FIG. 4, despite the intersection area 130, the click 170a is made on the contour of the avatar 140b and the prioritization and activation rules 410 choose the area 120b containing the avatar 140b as a winner.

Figure 5:
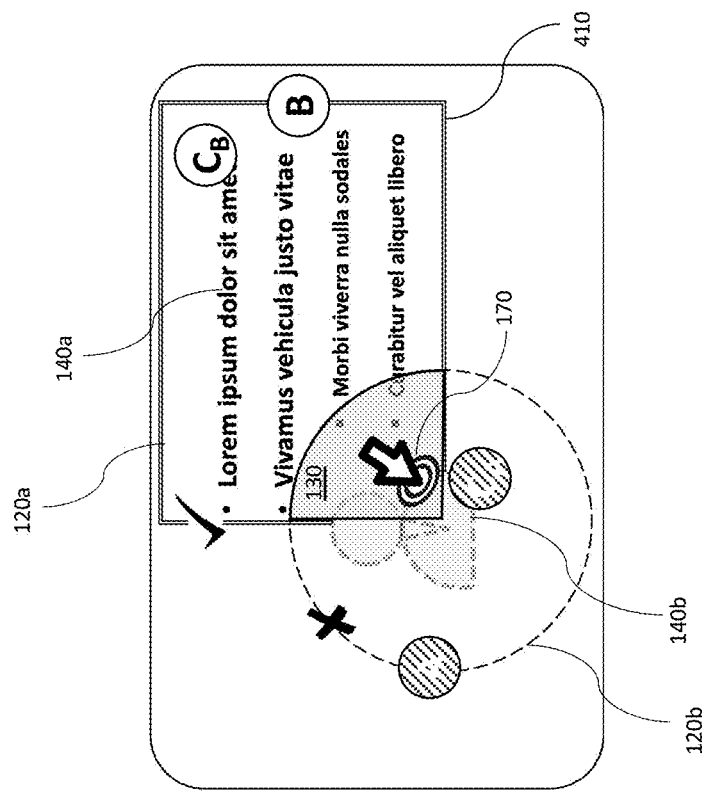
FIG. 5 is a schematic illustration of activation options for overlapping screen areas with a transparent presenter avatar, according to an embodiment of the system described herein.

FIG. 5 is a schematic illustration 500 of the activation options for overlapping screen areas with a transparent presenter avatar. In the notations of FIGS. 3, 4, the two screen areas 120a, 120b are intersecting over the intersection 130; the content of the area 120a is the presentation slide 140a, while the content of the area 120b is the avatar 140b, which may be a semi-transparent image captured by a camera of the presenter and using a circular mask and immersed into the presentation scene overlapping with the slide. Under one presentation scenario, the presenter has intentionally made the avatar 140b semi-transparent to keep the expressive abilities (such as pointing to the presentation content on the slide), the source of presenter's voice and other characteristics accessible for the audience, while eliminating an obstruction of the slide caused by the presence of the avatar 140b. Accordingly, the prioritization and activation rules may be sensitive to a transparency level of the avatar 140b and, in contrast with the activation rules in FIG. 4, when the click 170 touches or falls inside the a shape of the avatar 140b, the rules may assess the transparency level of the avatar 140b and, in case of a significantly transparent shape (e.g., greater than 50% transparent), may choose to activate the area 120a containing the presentation slide 140a, as indicated by the bold area signifiers A, $A_C$ and the activation checkmark.

Figure 6:
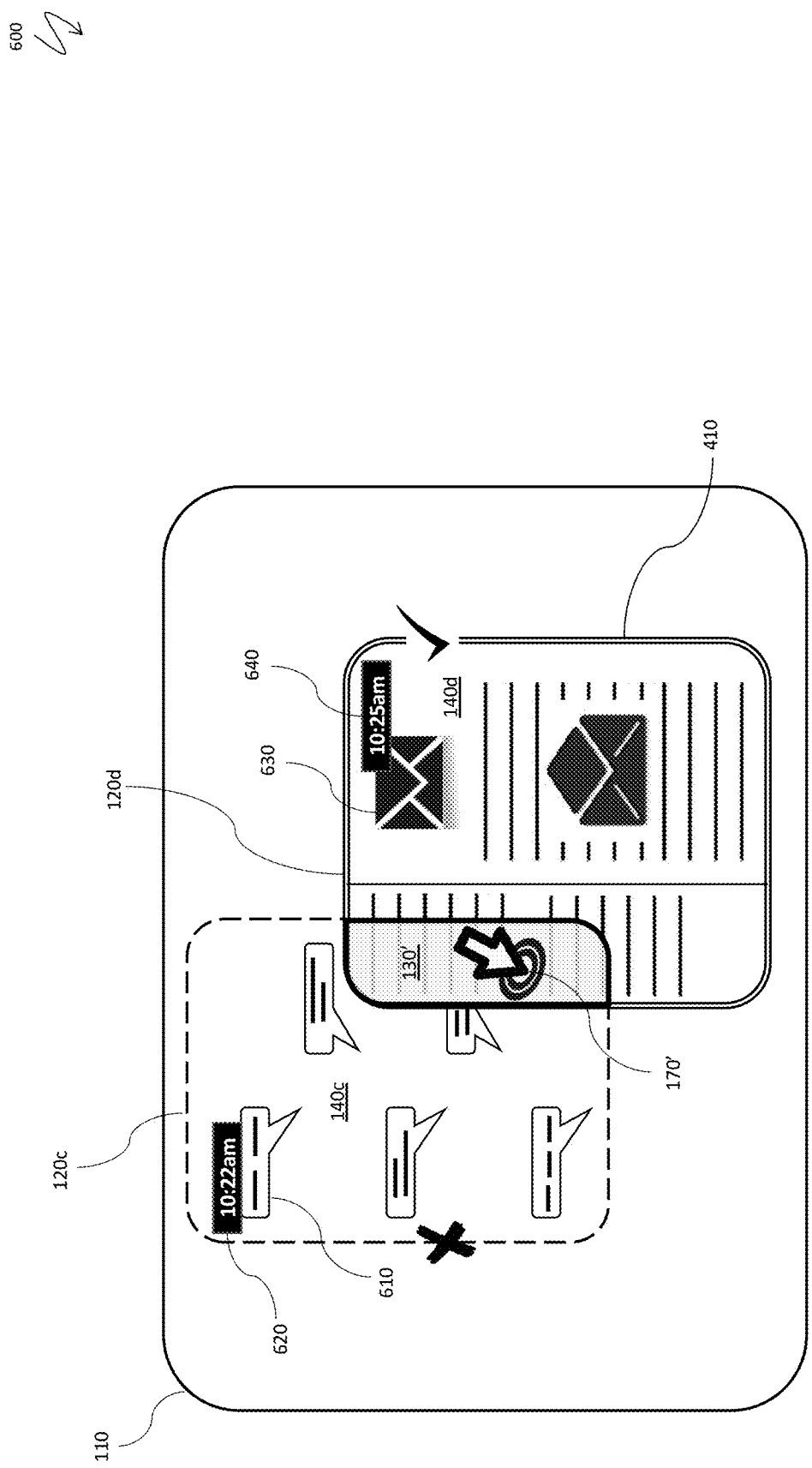
FIG. 6 is a schematic illustration of activation options for overlapping screen areas of messaging applications, according to an embodiment of the system described herein.

FIG. 6 is a schematic illustration 600 of the activation options for overlapping screen areas of messaging applications. Two screen areas 120c and 120d have rounded rectangular shapes and include an intersection 130'; the screen area 120c belongs to a messaging application generating content 140c; the screen area 120c is an email pane with content 140d. In this case, the prioritization and activation rules are monitoring the timing of the most recent content change in the screen areas. Specifically, when a click 170' hits the intersection 130', the system checks for a most recent message 610 in the area 120c and for timing 620 of the message 610, as well as a most recent email 630 in the area 120d and a timing 640 of the most recent email 630. By comparing the times of the most recent content changes and choosing the latest of the time, the system identifies an activation winner 410, which in this case belongs to the area 120d (the timing 640 is 10:25 am and is more recent than the timing 620 of 10:22).

Figure 7:
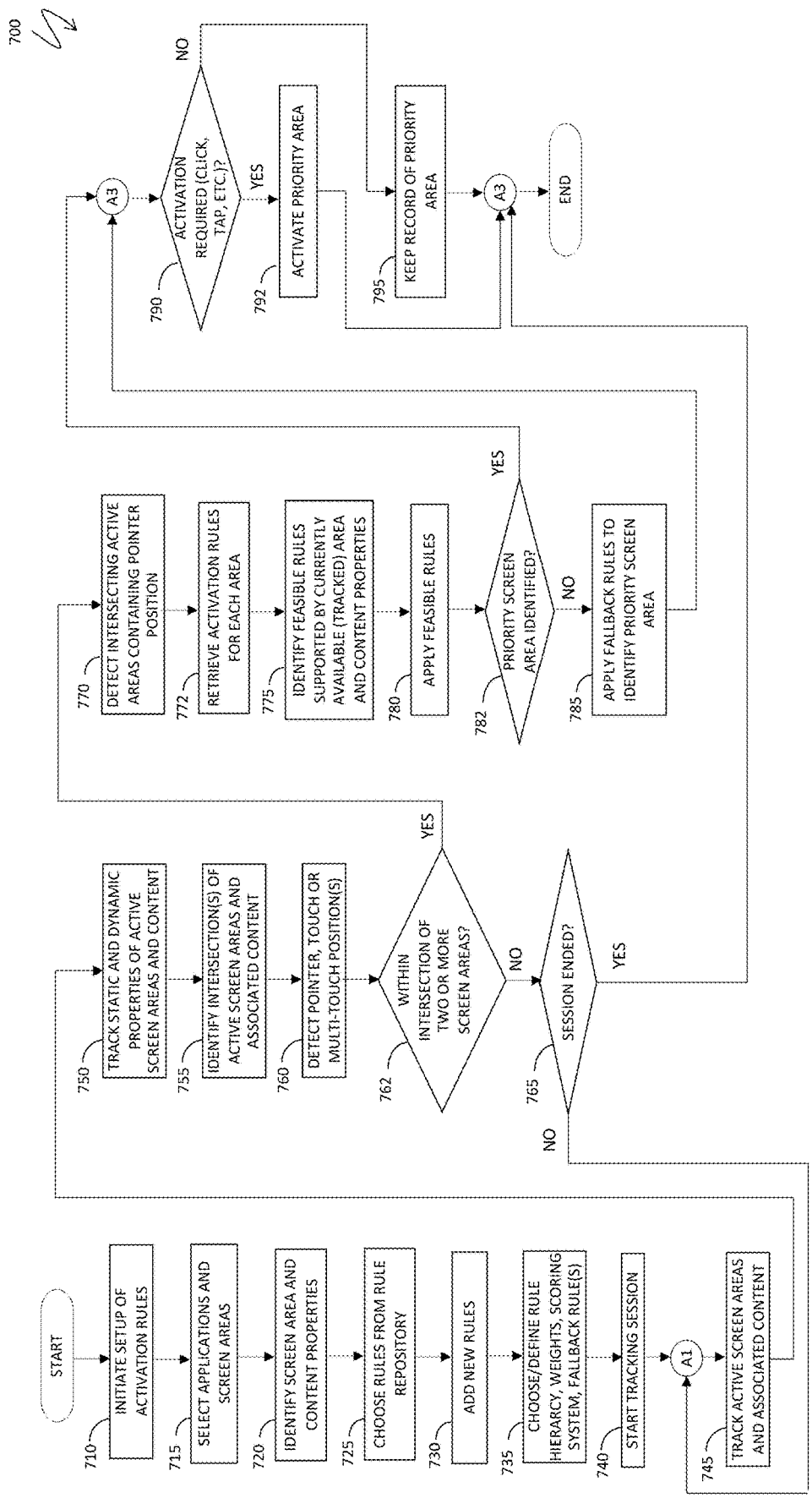
FIG. 7 is a system flow diagram illustrating system functioning in connection with prioritization and activation choices between multiple overlapping screen areas of simultaneously running applications, according to an embodiment of the system described herein.

Referring to FIG. 7, a system flow diagram 700 illustrates system functioning in connection with prioritization and activation choices between multiple overlapping screen areas of simultaneously running applications. Processing begins at a step 710, where a setup of prioritization and activation rules is initiated. After the step 710, processing proceeds to a step 715, where running applications and the corresponding screen areas are selected. After the step 715, processing proceeds to a step 720, where the screen area and content properties relevant to the prioritization and activation rules are identified. After the step 720, processing proceeds to a step 725, where an initial set of rules is chosen from the rule repository. After the step 725, processing proceeds to a step 730, where the system adds new rules (possibly defined or customized by a user). After the step 730, processing proceeds to a step 735, where the system chooses or defines rule hierarchy, weights of components in composite rules, scoring system, fallback, and tiebreak rules, as explained elsewhere herein. After the step 735, processing proceeds to a step 740, where a tracking session starts.

After the step 740, processing proceeds to a step 745, where the system tracks active screen areas and associated content. After the step 745, processing proceeds to a step 750, where the system tracks static and dynamic properties of active screen areas and content. After the step 750, processing proceeds to a step 755, where the system identifies the intersections of active screen areas and the associated content, as explained elsewhere herein (see, for example, FIG. 1 and the accompanying text). After the step 755, processing proceeds to a step 760, where the system detects the position(s) of a pointer, touch, or a multi-touch gesture, as explained elsewhere herein, for instance, in connection with FIGS. 1, 3-6. After the step 760, processing proceeds to a test step 762, where it is determined whether the pointer (touch, multi-touch component) position is within an intersection of two or more screen areas; if not, processing proceeds to a test step 765, where it is determined whether the tracking session has ended. If so, processing is complete; otherwise, processing proceeds back to the step 745 (which may be independently reached from the step 740, discussed above).

If it was determined at the test step 762 that the pointer position belongs to an intersection of two or more screen areas, processing proceeds to a step 770, where the system detects the intersecting active screen areas that contain the current position of the pointer. After the step 770, processing proceeds to a step 772, where the prioritization and activation rules for each area are retrieved. After the step 772, processing proceeds to a step 775, where the system identifies feasible rules supported by the currently available (i.e., tracked) area and content properties (see, for example, FIG. 2 and the accompanying text for more information). After the step 775, processing proceeds to a step 780, where the system applies feasible prioritization and/or activation rules, as generally explained in FIG. 1 and exemplified in FIGS. 3-6 and the accompanying text. After the step 780, processing proceeds to a test step 782, where it is determined whether the priority/activation screen area is identified. If not, processing proceeds to a step 785, where the feasible and applicable fallback and possibly tiebreak rules are applied to identify the priority screen area and the corresponding active application. After the step 785, processing proceeds to a test step 790, where it is determined whether an activation (via a click, tap, etc.) is required, as explained elsewhere herein and exemplified in FIGS. 4-6 and the accompanying text. If so, processing proceeds to a step 792, where the priority screen area is activated. After the step 792, processing is complete. If it was determined at the test step 790 that activation is not required, processing proceeds to a step 795, where the system keeps record of the priority screen area. After the step 795, processing is complete. Note that the test step 790 may be independently reached from the test step 782 if it was determined that the priority screen area is identified.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, system configurations may vary from the illustrations presented herein. Further, various aspects of the system described herein may be deployed on various devices, including, but not limited to wearable devices, smartphones, tablets, and other mobile computers. Mobile devices may use operating system(s) selected from the group consisting of: iOS, Android OS, Windows Phone OS, Blackberry OS, and mobile versions of Linux OS. Certain components of the system may be cloud based and interact with mobile computers.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of selecting an active one of a plurality of screen areas of one or more applications presented to a user on a screen, comprising:
    determining properties of the screen areas corresponding to at least one of:
    brightness, playing audio, displaying an avatar, transparency of an avatar, timing of new content, intensity of content change, number of objects, number of objects in an intersection of multiple areas, and speed of objects in a particular area;
    providing the avatar within a particular one of the screen areas;
    setting one or more rules for choosing one of a plurality of the screen areas for a plurality of applications based on at least one of the properties;
    and selecting the particular one of the screen areas containing the avatar to be the active one of the plurality of screen areas based on the rules, the properties, and location of a pointer or touch area being within a contour of the avatar and the avatar being located, at least partially, within an intersection of different ones of the screen areas, wherein a screen area other than the particular one of the screen areas containing the avatar is selected in response to the pointer or touch area being within the particular one of the screen areas and outside the contour of the avatar and wherein the avatar corresponds to an image of an object and wherein the image is smaller than and located in the particular one of the screen areas.

2. The method of claim 1, wherein the avatar is of a person making a presentation and the intersection of different ones of the screen areas includes at least a portion of a presentation slide being used by the person.

3. The method of claim 2, wherein the screen area that includes the avatar is selected in response to a current hovering pointer being over the contour of the avatar.

4. The method of claim 2, wherein the screen area that includes the avatar is selected in response to either touching or clicking into an area within the contour of the avatar.

5. The method of claim 2, wherein the screen area that includes the presentation slide is selected in response to a current hovering pointer being over the contour of the avatar and the avatar being more transparent than a predetermined threshold.

6. The method of claim 5, wherein the predetermined threshold is 50%.

7. The method of claim 2, wherein the screen area that includes the presentation slide is selected in response to either touching or clicking into an area within the contour of the avatar and the avatar being more transparent than a predetermined threshold.

8. The method of claim 7, wherein the predetermined threshold is 50%.

9. The method of claim 1, wherein at least some of the rules are composite rules that combine other rules and additional constraints.

10. The method of claim 1, wherein selecting the particular one of the screen areas containing the avatar includes an arbiter component aggregating rule outcomes into a choice of the particular one of the screen areas.

11. A non-transitory computer readable medium containing software that selects an active one of a plurality of screen areas of one or more applications presented to a user on a screen, the software comprising:
    executable code that determines properties of the screen areas corresponding to at least one of:

brightness, playing audio, displaying an avatar, transparency of an avatar, timing of new content, intensity of content change, number of objects, number of objects in an intersection of multiple areas, and speed of objects in a particular area, the avatar being provided within a particular one of the screen areas;

and executable code that selects the particular one of the screen areas containing the avatar to be the active one of the plurality of screen areas based on the properties, location of a pointer or touch area being within a contour of the avatar and the avatar being located, at least partially, within an intersection of different ones of the screen areas, and on one or more rules that are set for choosing one of the plurality of the screen areas for the plurality of applications based on at least one of the properties, wherein a screen area other than the particular one of the screen areas containing the avatar is selected in response to the pointer or touch area being within the particular one of the screen areas containing the avatar and outside the contour of the avatar and wherein the avatar corresponds to an image of an object and wherein the image is smaller than and located in the particular one of the screen areas.

12. The non-transitory computer readable medium of claim 11, wherein the avatar is of a person making a presentation and the intersection of different ones of the screen areas includes at least a portion of a presentation slide being used by the person.

13. The non-transitory computer readable medium of claim 12, wherein the screen area that includes the avatar is selected in response to a current hovering pointer being over the contour of the avatar.

14. The non-transitory computer readable medium of claim 12, wherein the screen area that includes the avatar is selected in response to either touching or clicking into an area within the contour of the avatar.

15. The non-transitory computer readable medium of claim 12, wherein the screen area that includes the presentation slide is selected in response to a current hovering pointer being over the contour of the avatar and the avatar being more transparent than a predetermined threshold.

16. The non-transitory computer readable medium of claim 15, wherein the predetermined threshold is 50%.

17. The non-transitory computer readable medium of claim 12, wherein the screen area that includes the presentation slide is selected in response to either touching or clicking into an area within the contour of the avatar and the avatar being more transparent than a predetermined threshold.

18. The non-transitory computer readable medium of claim 17, wherein the predetermined threshold is 50%.

19. The non-transitory computer readable medium of claim 11, wherein at least some of the rules are composite rules that combine other rules and additional constraints.

20. The non-transitory computer readable medium of claim 11, wherein selecting the particular one of the screen areas containing the avatar includes an arbiter component aggregating rule outcomes into a choice of the particular one of the screen areas.

* * * * *